US011190990B2

(12) United States Patent
Li et al.

(10) Patent No.: US 11,190,990 B2
(45) Date of Patent: Nov. 30, 2021

(54) FRAMEWORK AND METHOD FOR DYNAMIC CHANNEL SELECTION FOR IEEE 802.15.4Z

(71) Applicant: Samsung Electronics Co., Ltd., Suwon-si (KR)

(72) Inventors: Zheda Li, Plano, TX (US); Seongah Jeong, Seoul (KR); Aditya V. Padaki, Richardson, TX (US); Mingyu Lee, Seongnam-si (KR); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/929,365

(22) Filed: Apr. 28, 2020

(65) Prior Publication Data

US 2020/0359275 A1 Nov. 12, 2020

Related U.S. Application Data

(60) Provisional application No. 62/844,491, filed on May 7, 2019, provisional application No. 62/846,323, filed (Continued)

(51) Int. Cl.
*H04W 36/00* (2009.01)

(52) U.S. Cl.
CPC ................................ *H04W 36/0055* (2013.01)

(58) Field of Classification Search
CPC ..... H04W 24/10; H04W 72/04; H04W 28/06; H04W 36/0088; H04W 36/0055;

(Continued)

(56) References Cited

U.S. PATENT DOCUMENTS 10,230,790 B2 3/2019 Wang et al.
2012/0294245 A1 11/2012 Chang et al.

(Continued)

FOREIGN PATENT DOCUMENTS

KR 10-2017-0143029 A 12/2017
WO 2011049385 A2 4/2011

OTHER PUBLICATIONS

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.

(Continued)

*Primary Examiner* — Allahyar Kasraian

(57) ABSTRACT

A method and apparatus of a first network entity in a wireless communication system supporting a ranging channel operation is provided. The method and apparatus comprises: identifying, at a higher layer, a RCPCS IE to indicate a sub-band to be selected for the ranging channel operation, wherein the RCPCS IE includes a CCI of a CCI timer; generating, at the higher layer, a MCPS-DATA.request primitive including the RCPCS IE, wherein the MCPS-DATA.request primitive is transmitted to a MAC layer; in response to receiving, at the MAC layer, the MCPS-DATA.request primitive from the higher layer, generate data including the RCPCS IE; transmitting, to a second network entity, the data including the RCPCS IE, wherein the RCPCS IE includes a CRCT that is configured as a duration for maintaining the sub-band; and receiving an acknowledgement corresponding to the data including the RCPCS IE.

20 Claims, 17 Drawing Sheets

Related U.S. Application Data on May 10, 2019, provisional application No. 62/869,079, filed on Jul. 1, 2019, provisional application No. 62/916,418, filed on Oct. 17, 2019.

(58) Field of Classification Search

CPC .............. H04W 28/16; H04W 72/0453; H04B 7/0626; H04B 7/0632; H04B 17/309; H04L 1/0026; H04L 5/0057; H04L 5/0053; H04L 5/0035; H04L 5/0092; H04L 5/001; H04L 1/0027; H04L 1/0028; H04L 69/22; H04L 5/0051; H04L 5/0055; H04L 5/0073; H04L 5/0085

See application file for complete search history.

(56) References Cited

U.S. PATENT DOCUMENTS

| | | | | |
|---|---|---|---|---|
| 2013/0201928 | A1* | 8/2013 | Kim | H04W 16/14 370/329 |
| 2015/0023342 | A1 | 1/2015 | Joo | |
| 2017/0019163 | A1* | 1/2017 | Yoshimoto | H04L 1/00 |
| 2017/0367003 | A1* | 12/2017 | Zhang | H04W 88/10 |
| 2018/0270885 | A1 | 9/2018 | Joo et al. | |
| 2019/0230597 | A1* | 7/2019 | Akkarakaran | H04W 52/143 |
| 2020/0154473 | A1* | 5/2020 | Padaki | H04W 40/244 |
| 2020/0183000 | A1* | 6/2020 | Li | G01S 13/878 |
| 2020/0200862 | A1* | 6/2020 | Li | G01S 5/0226 |
| 2020/0213842 | A1* | 7/2020 | Li | H04W 12/55 |
| 2020/0225341 | A1* | 7/2020 | Li | H04L 5/0055 |
| 2020/0228331 | A1* | 7/2020 | de Perthuis | H04L 9/16 |
| 2020/0229068 | A1* | 7/2020 | Li | H04W 48/16 |
| 2020/0259523 | A1* | 8/2020 | McLaughlin | H03M 13/23 |
| 2020/0275484 | A1* | 8/2020 | Xu | H04W 72/0453 |
| 2020/0287959 | A1* | 9/2020 | Li | H04W 72/0446 |
| 2020/0351801 | A1* | 11/2020 | Jeon | H04W 52/362 |
| 2020/0351811 | A1* | 11/2020 | Li | H04W 64/00 |
| 2021/0014677 | A1* | 1/2021 | Han | G01S 5/0284 |
| 2021/0143943 | A1* | 5/2021 | Zhou | H04L 1/1819 |

OTHER PUBLICATIONS

"IEEE Standard for Low-Rate Wireless Networks", IEEE Computer Society, IEEE Std 802.15.4TM, Dec. 2015, 708 pages.

International Search Report and Written Opinion of the International Searching Authority in connection with International Patent Application No. PCT/KR2020/005979 dated Aug. 6, 2020, 14 pages.

* cited by examiner

1300

| | |
|---|---|
| Bits: 4 | 4 |
| Channel Number | Reserved |

| | | | |
|---|---|---|---|
| Bits: 1 | 4 | 3 | Octets:0/4 |
| CCTP | Channel Number | Reserved | CCCT |

| | | | | | |
|---|---|---|---|---|---|
| Bits: 1 | 1 | 4 | 2 | Octets:0/4 | 0/4 |
| CCTP | RCTP | Channel Number | Reserved | CCCT | CRCT |

| Bits: 1 | 4 | 3 | Octets:0/4 |
|---|---|---|---|
| RCTP | Channel Number | Reserved | CRCT |

| Bits: 1 | 1 | 4 | 2 | Octets:0/4 | 0/4 | 1 | 1 | 2 |
|---|---|---|---|---|---|---|---|---|
| CCTP | RCTP | Channel Number | Reserved | CCCT | CRCT | TX Preamble Code | RX Preamble Code | PSR |

| Bits: 1 | 1 | 2 | 4 | Octets: 0/4 | 0/1 | 0/1 | 0/2 |
|---|---|---|---|---|---|---|---|
| CCTP | PSP | Reserved | Channel Number | CCCT | TX Preamble Code | RX Preamble Code | PSR |

FIG. 18

FRAMEWORK AND METHOD FOR DYNAMIC CHANNEL SELECTION FOR IEEE 802.15.4Z

CROSS-REFERENCE TO RELATED APPLICATIONS AND CLAIM OF PRIORITY

The present application claims priority to:

U.S. Provisional Patent Application No. 62/844,491 filed on May 7, 2019;

U.S. Provisional Patent Application No. 62/846,323 filed on May 10, 2019;

U.S. Provisional Patent Application No. 62/869,079 filed on Jul. 1, 2019; and

U.S. Provisional Patent Application No. 62/916,418 filed on Oct. 17, 2019.

The contents of the above-identified patent documents are incorporated herein by reference.

TECHNICAL FIELD

The present disclosure relates generally to wireless communication system. In particular, dynamic channel selection for IEEE 802.15.4z is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide dynamic channel selection for IEEE 802.15.4z.

In one embodiment, a first network entity in a wireless communication system supporting a ranging channel operation is provided. The first network entity comprises a processor configured to identify, at a higher layer, a ranging channel and preamble code selection information element (RCPCS IE) to indicate a sub-band to be selected for the ranging channel operation, wherein the RCPCS IE includes a channel configuration interval (CCI) of a CCI timer; generate, at the higher layer, a medium access control common part sublayer data request (MCPS-DATA.request) primitive including the RCPCS IE, wherein the MCPS-DATA.request primitive is transmitted to a MAC layer; in response to receiving, at the MAC layer, the MCPS-DATA.request primitive from the higher layer, generate data including the RCPCS IE. The first network entity is further comprises a transceiver operably connected to the processor, the transceiver configured to: transmit, to a second network entity, the data including the RCPCS IE, wherein the RCPCS IE includes a channel resetting counter (CRCT) that is configured as a duration for maintaining the sub-band; and receive an acknowledgement corresponding to the data including the RCPCS IE.

In another embodiment, a second network entity in a wireless communication system supporting a ranging channel operation is provided. The second network entity comprises a transceiver, configured to receive, from a first network entity, data including a ranging channel and preamble code selection information element (RCPCS IE), wherein the RCPCS IE includes a channel resetting counter (CRCT) that is configured as a duration for maintaining a sub-band. The second network entity further comprises a processor operably connected to the transceiver, the processor configured to identify, at a higher layer, the RCPCS IE indicating the sub-band to be selected for the ranging channel operation, wherein the RCPCS IE includes a channel configuration interval (CCI) of a CCI timer. The transceiver is further configured to transmit, to the first network entity, an acknowledgement corresponding to the data including the RCPCS IE.

In yet another embodiment, a method of a first network entity in a wireless communication system supporting a ranging channel operation is provided. The method comprises identifying, at a higher layer, a ranging channel and preamble code selection information element (RCPCS IE) to indicate a sub-band to be selected for the ranging channel operation, wherein the RCPCS IE includes a channel configuration interval (CCI) of a CCI timer; generating, at the higher layer, a medium access control common part sublayer data request (MCPS-DATA.request) primitive including the RCPCS IE, wherein the MCPS-DATA.request primitive is transmitted to a MAC layer; in response to receiving, at the MAC layer, the MCPS-DATA.request primitive from the higher layer, generate data including the RCPCS IE; transmitting, to a second network entity, the data including the RCPCS IE, wherein the RCPCS IE includes a channel resetting counter (CRCT) that is configured as a duration for maintaining the sub-band; and receiving an acknowledgement corresponding to the data including the RCPCS IE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates an example control filed format of RCS IE according to embodiments of the present disclosure;

FIG. 14 illustrates an example content field format of RCS IE with CCCT field according to embodiments of the present disclosure;

FIG. 15 illustrates an example content field format of RCS IE with CCCT and CRCT field according to embodiments of the present disclosure;

FIG. 16 illustrates an example content field format of RCS IE with CRCT field according to embodiments of the present disclosure;

FIG. 17 illustrates an example content field format of RCPCS IE with CRCT field according to embodiments of the present disclosure;

FIG. 18 illustrates an example ranging channel and preamble code selection IE content field format according to embodiments of the present disclosure;

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Figure 1:
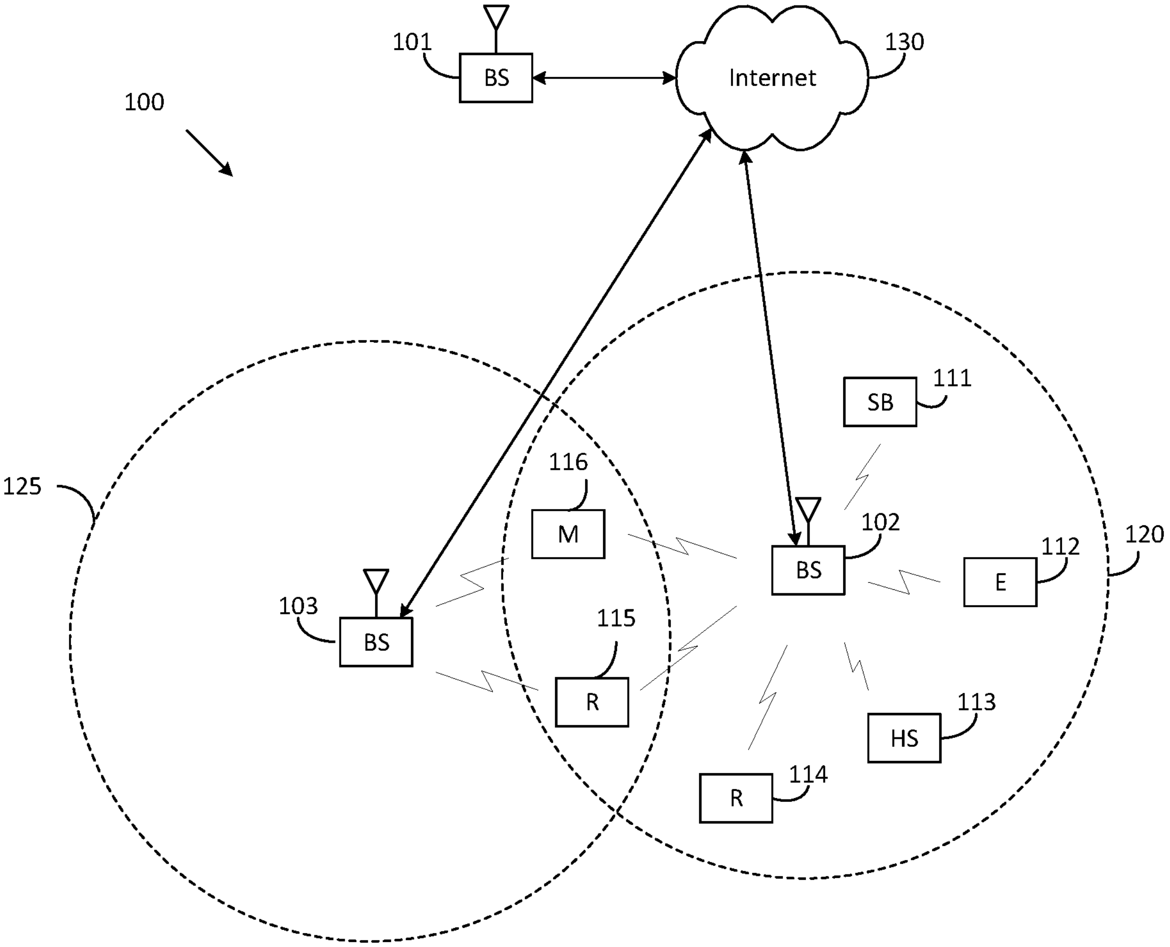
FIG. 1 illustrates an example wireless network according to embodiments of the present disclosure.
Figure 2:
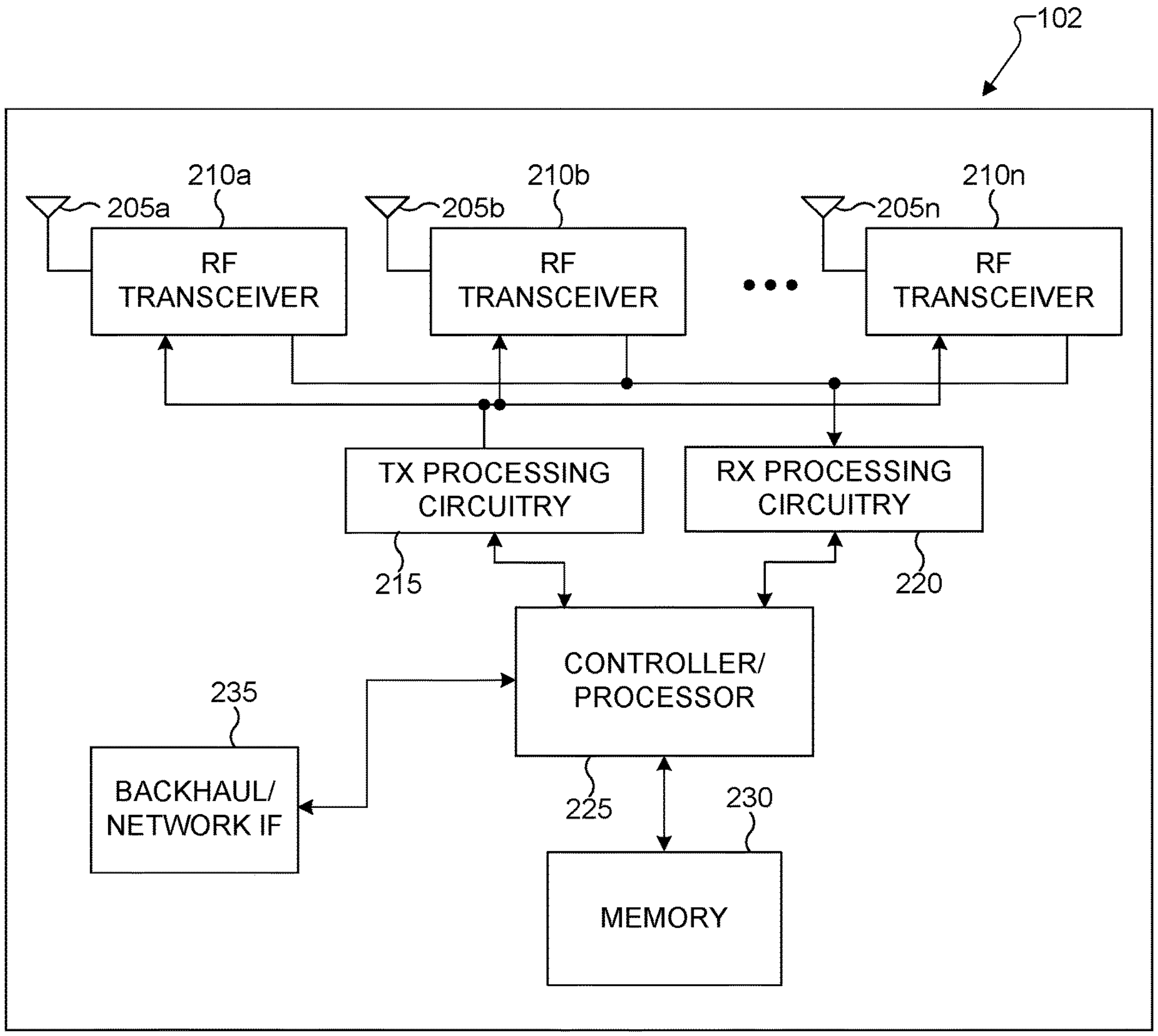
FIG. 2 illustrates an example gNB according to embodiments of the present disclosure.
Figure 3:
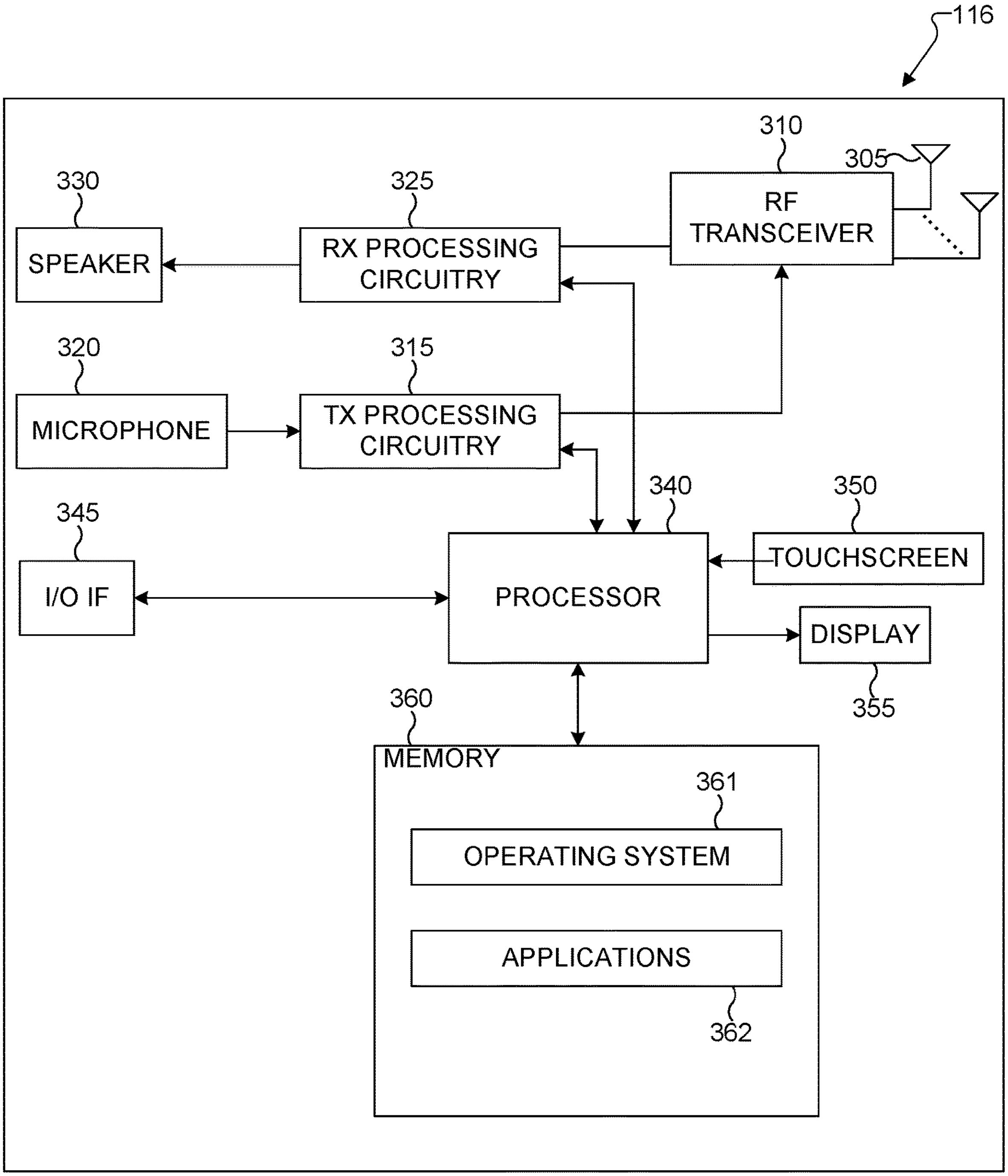
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs)

within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, dynamic channel selection for IEEE 802.15.4z. In certain embodiments, and one or more of the gNBs 101-103 includes circuitry, programming, or a combination thereof, for dynamic channel selection for IEEE 802.15.4z. Additionally, while various embodiments are described for use with the IEEE 802.15.4z standard, the present disclosure is not limited thereto. Embodiments of the present disclosure may be utilized in or with any communications standard or protocol.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205*a*-205*n*, multiple RF transceivers 210*a*-210*n*, transmit (TX) processing circuitry 215, and receive (RX) processing circuitry 220. The gNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
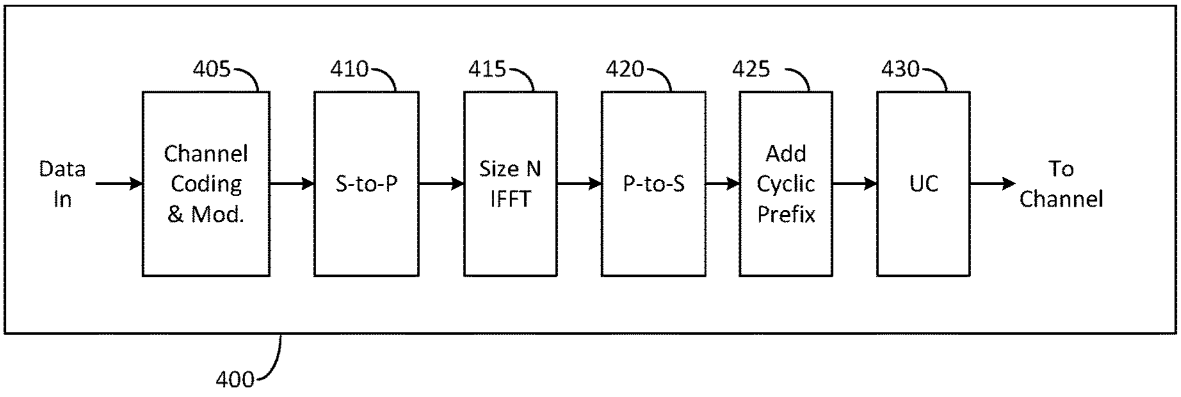
FIG. 4A illustrates a high-level diagram of an orthogonal frequency division multiple access transmit path according to embodiments of the present disclosure.
Figure 4B:
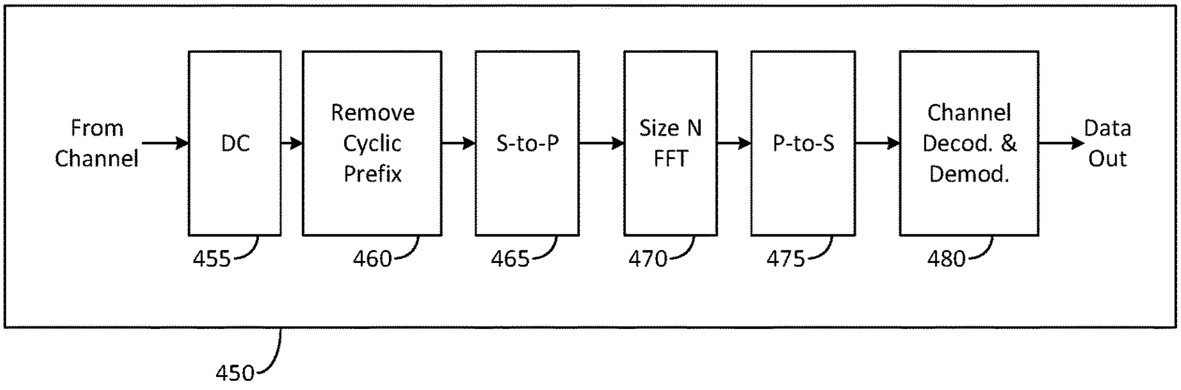
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
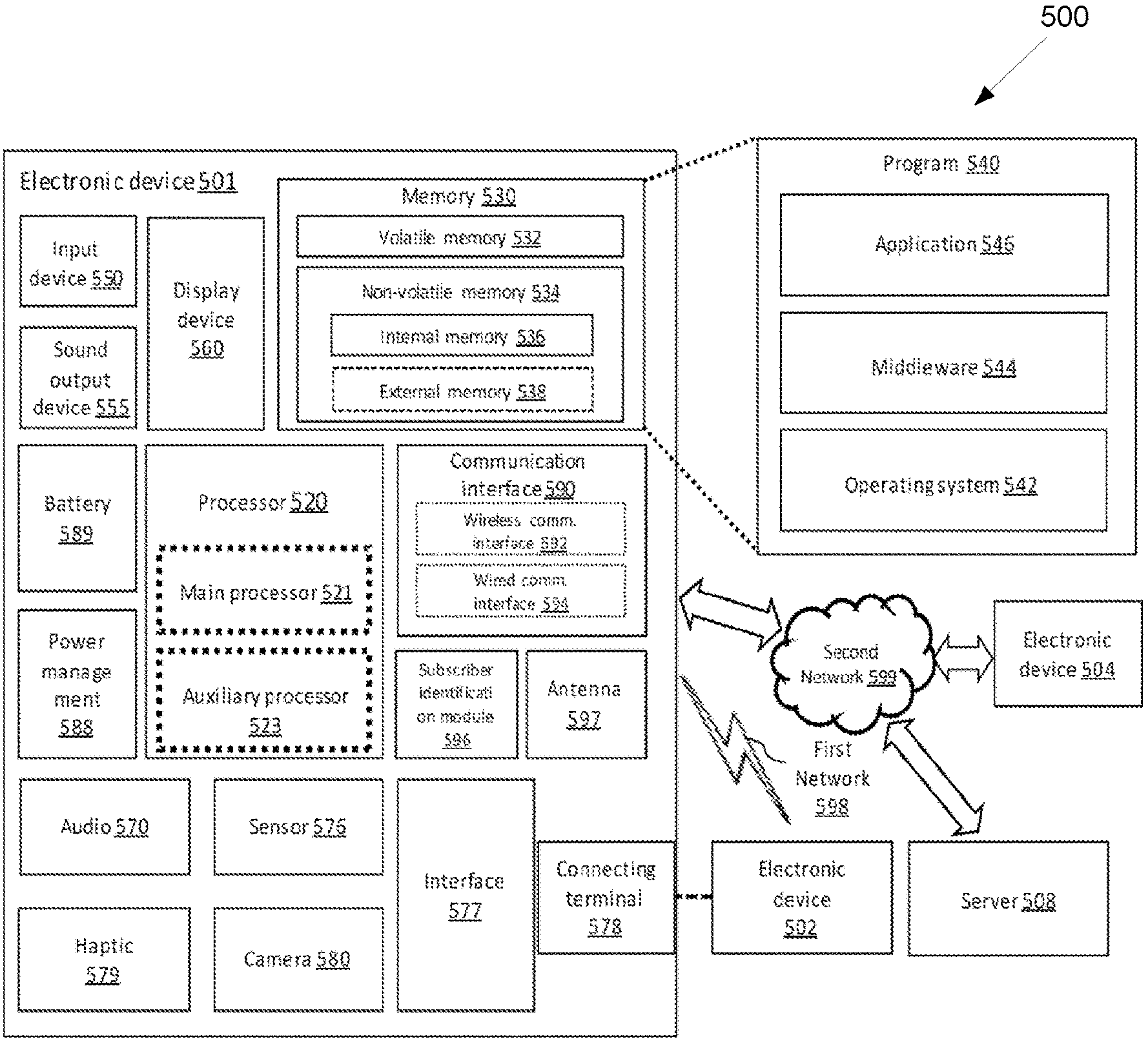
FIG. 5 illustrates an example electronic device according to embodiments of the present disclosure.

FIG. 5 illustrates an example electronic device 501 according to embodiments of the present disclosure. The embodiment of the electronic device 501 illustrated in FIG. 5 is for illustration only. FIG. 5 does not limit the scope of the present disclosure to any particular implementation. The electronic device 501 may be performed a function or functions of 111-116 as illustrated in FIG. 1. In one embodiment, the electronic device may be 111-116 and/or 101-103 as illustrated in FIG. 1.

PDs can be an electronic device. FIG. 5 illustrates an example electronic device 501 according to various embodiments. Referring to FIG. 5, the electronic device 501 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using sub scriber information (e.g., international mobile sub scriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute at least one of the one or more instructions stored in the storage medium, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill the scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Figure 6:
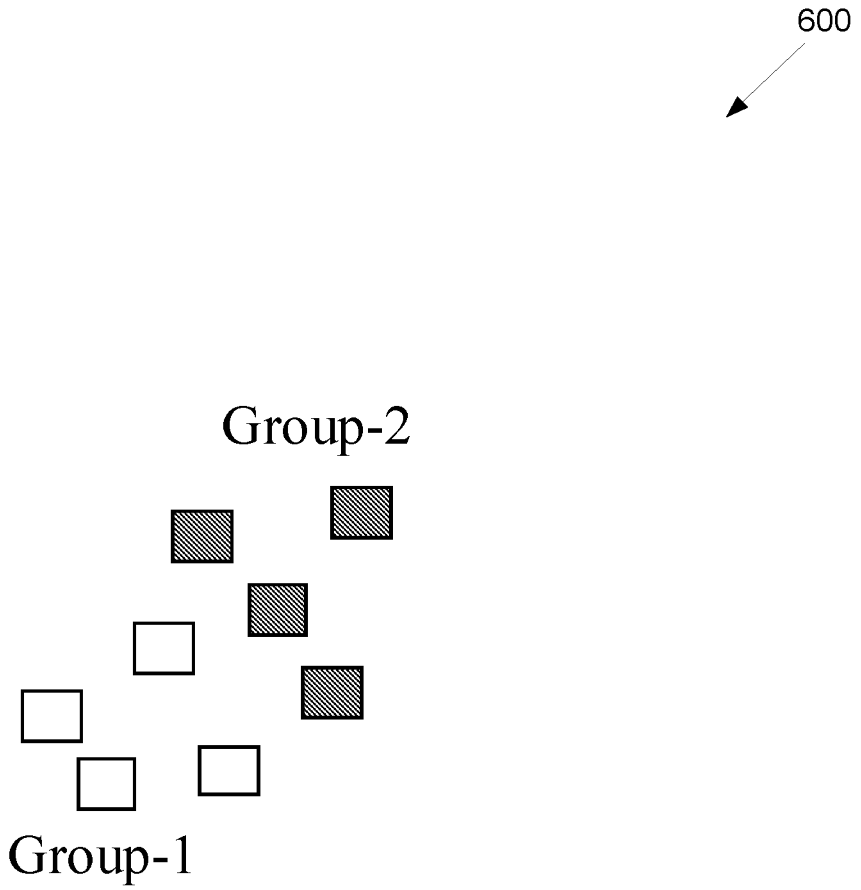
FIG. 6 illustrates an example many-to-many scenario according to embodiments of the present disclosure.

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation. As illustrated in FIG. 6, each node in group 1 and group 2 may performs a function or functions of 111-116 and 101-103 as illustrated in FIG. 1. In one embodiment, each node in group 1 and group 2 may be one of 111-116 and/or be one of 101-103 as illustrated in FIG. 1.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

There are two aspects neglected in IEEE standard specification, which are essential for future use cases. The first one is the optimized transmission procedure between one or more initiators and one or more responders, which can be critical for energy-saving purpose. Since a poll can be broadcast to multiple responders, an initiator can initialize a multicast, i.e., one-to-many, ranging round by sending a single poll instead of launching multiple unicast ranging rounds. Similarly, since the ranging response can also be broadcast to multiple initiators, a responder can embed the requested data respectively from different initiator in a single ranging response message. Exploiting the broadcast characteristics of wireless channel, the optimized transmission procedure is promising for future UWB network.

The other neglected aspect is the option for the contention-based ranging in an UWB network. In IEEE specification, one ranging round just contains a single pair of devices, i.e., one initiator and one responder. Within one ranging round, transmissions are implicitly scheduled: a responder/initiator expects to receive the message from the far end and may start to transmit afterwards. multiple ranging rounds can be scheduled by the CFP table of the sync frame. However, there can be other use cases that cannot be supported by IEEE standard specification. For example, the initiator broadcasts the poll, but the initiator does not have the prior-knowledge of who may response. Similarly, the responder may not have the prior-knowledge of who may initialize the ranging, so the responder can wait and listen for a certain period of time to collect polls respectively from different initiators.

In the present disclosure, an UWB network is provided with ranging requests between a group of devices and another group of devices. As shown in FIG. 6, one or more devices of group-1 has the ranging request to one or more devices of group-2 or vice versa. To accommodate optimized ranging transmission procedure and other new use cases, the configuration of device role, i.e., whether the configuration of device is an initiator or a responder, and the scheduling information for scheduling-based ranging, need to be determined and exchanged before the ranging round starts. Aiming to build a stand-alone UWB network, the present disclosure defines new control IE, and ranging scheduling IE for initiators and responders, which can be exchanged over the UWB MAC. However, the present disclosure does not preclude other methods to exchange information via the higher layer or out-of-band management.

Figure 7:
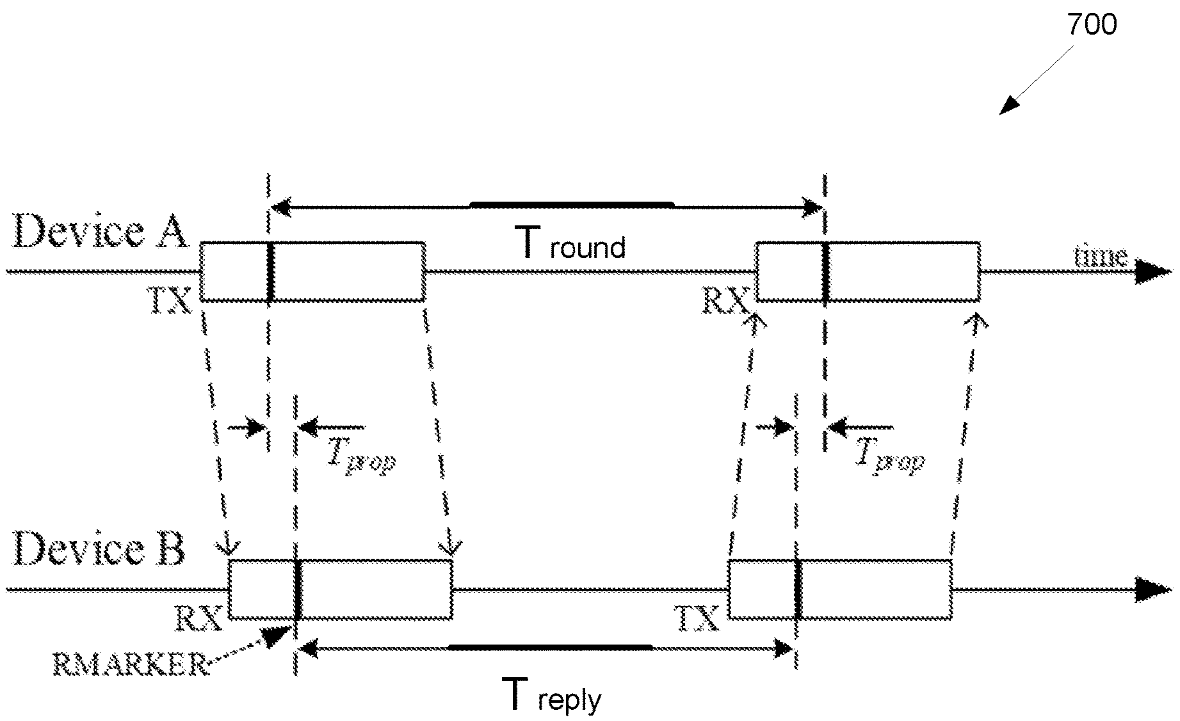
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation. The single-sided two-way ranging 700 may be performed in the electronic device 501 as illustrated in FIG. 5.

SS-TWR involves a simple measurement of the round-trip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation: $\hat{T}_{prop}=\frac{1}{2}(T_{round}-T_{reply})$.

Figure 8:
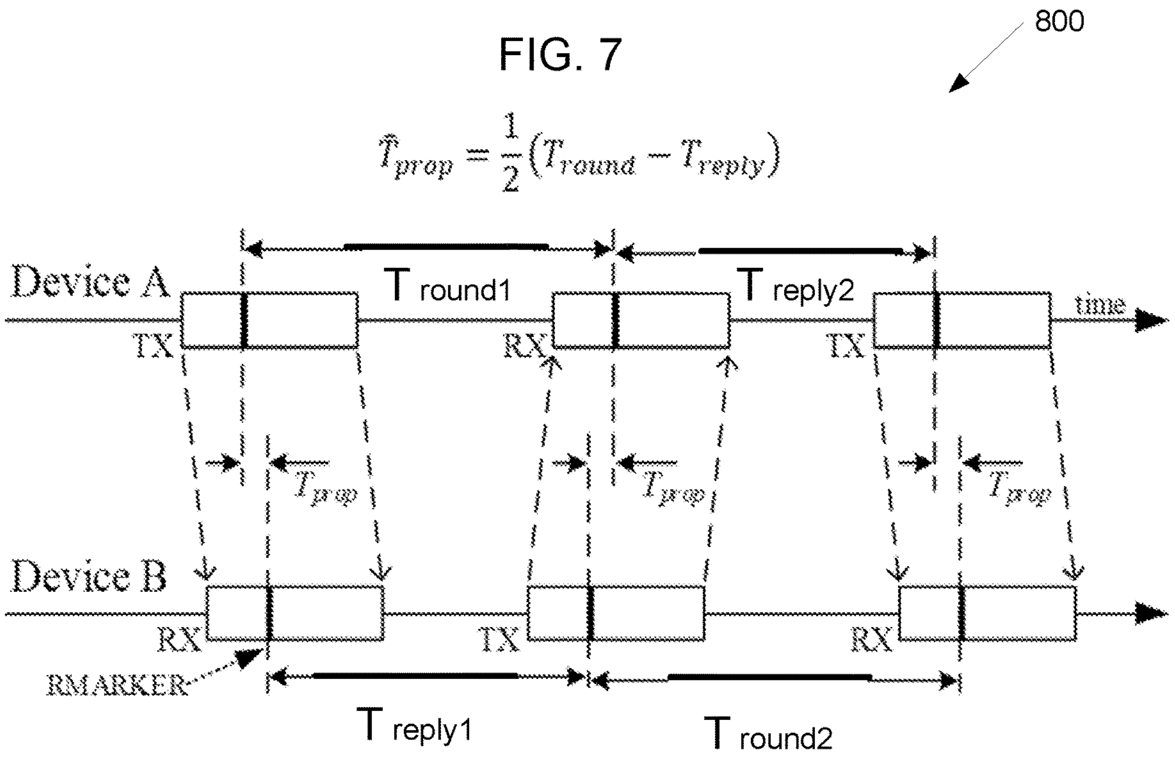
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation. The double-sided two-way ranging with three messages 800 may be performed in the electronic device 501 as illustrated in FIG. 5.

DS-TWR with three messages is illustrated in FIG. 8, which reduces the estimation error induced by clock drift from long response delays. Device A is the initiator to initialize the first round-trip measurement, while device B as the responder, responses to complete the first round-trip measurement, and meanwhile initialize the second round-trip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

In the development of IEEE 802.15.4z, the main enhancement for secure ranging is the inclusion a scrambled timestamp sequence (STS) in the basic PHY protocol data unit (PPDU) format. Since the unique STS of a device is known by one or more far ends in a trusted group, the secure ranging can be performed within the trusted group, and the chance of being attacked is significantly reduced. In the present disclosure, it is provided that STSs of devices have been exchanged successfully, which can be done via, e.g., a higher layer control or out-of-band management. How to initialize/update STS and exchange the STS between devices is out of the scope of this disclosure.

Figure 9:
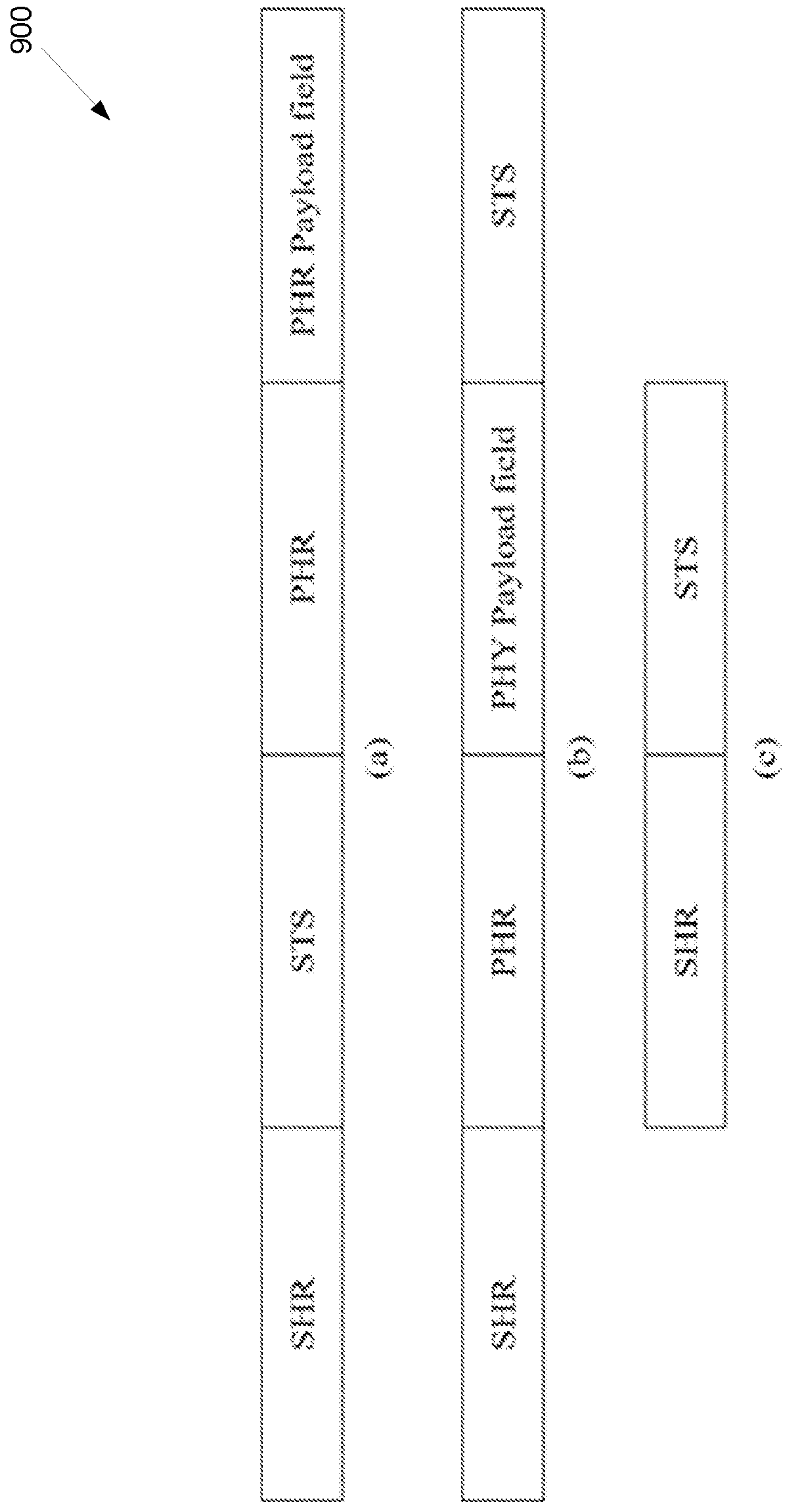
FIG. 9 illustrates an example secure ranging PPDU formats according to embodiments of the present disclosure.

FIG. 9 illustrates an example secure ranging PPDU formats 900 according to embodiments of the present disclosure. The embodiment of secure ranging PPDU formats 900 illustrated in FIG. 9 is for illustration only. FIG. 9 does not limit the scope of the present disclosure to any particular implementation. The secure ranging PPDU formats 900 may be used in the electronic device 501 (e.g., 101-103 and 111-116 as illustrated in FIG. 1) as illustrated in FIG. 5.

As illustrated in FIG. 9, three secure ranging PPDU formats may be supported, the difference between the formats being the location of the STS and existence of a PHR and PHY payload field as FIG. 9. In FIG. 9, a synchronization header (SHR), a (scrambled timestamp sequence) and a PHY header (PHY) are provided.

Since the STS dynamically change per each ranging frame, the security is enhanced to combat attacker. Specifically, it is extremely difficult for attacker to track the exact same STS of desired user for first path detection. However, in the current IEEE 802.15.4z, to update portions of STS may induce transmission of redundant bits. In the present disclosure, an UWB network is provided with ranging requests between a group of devices and another group of devices.

As illustrated in FIG. 6, one or more devices of group-1 has the ranging request to one or more devices of group-2 or vice versa. This disclosure modifies the format of control signaling to enhance the flexibility of adjusting STS.

Figure 10:
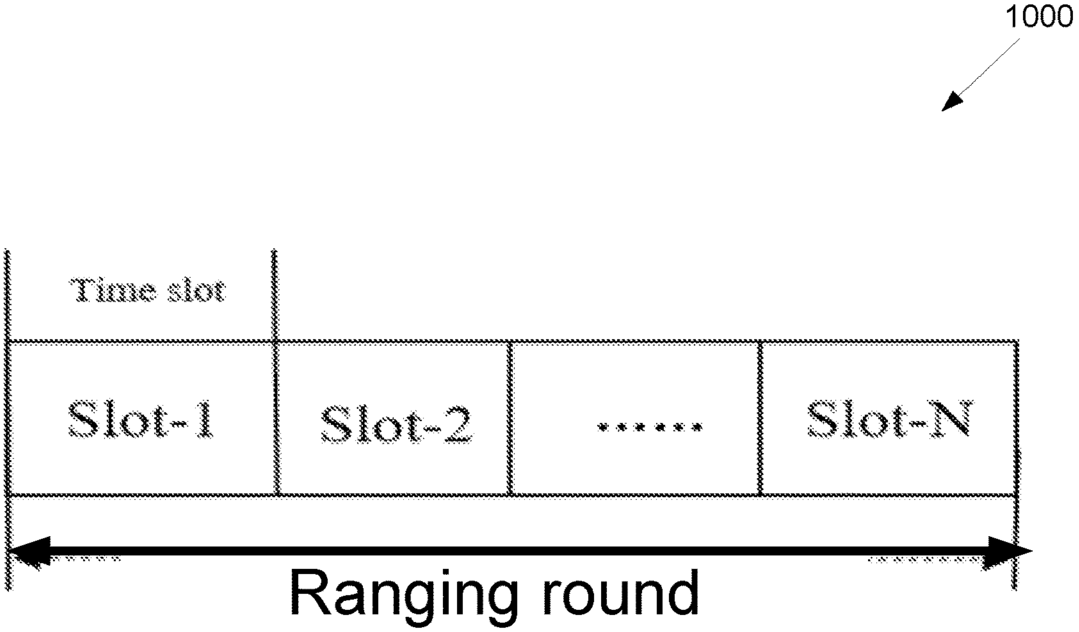
FIG. 10 illustrates an example structure of ranging round according to embodiments of the present disclosure.

FIG. 10 illustrates an example structure of ranging round 1000 according to embodiments of the present disclosure. The embodiment of the structure of ranging round 1000 illustrated in FIG. 10 is for illustration only. FIG. 10 does not limit the scope of the present disclosure to any particular implementation. The structure of ranging round 1000 may be used in the electronic device 501 (e.g., 101-103 and 111-116 as illustrated in FIG. 1) as illustrated in FIG. 5.

A ranging configuration incorporates the control information of a ranging round, which consists of multiple time slots as FIG. 10. Time slot is the basic time unit to fulfill a message exchange. Other conventions to fulfill the same functionalities as ranging round and time slot are not precluded in this disclosure. Depending on the device capabilities, slot duration and number of time slots in a ranging round can be adjusted in the ranging configuration, or the slot duration and number of time slots in a ranging round are fixed to a default setting. One or multiple pairs of devices can participate in a ranging round to fulfill the ranging requests.

Figure 11:
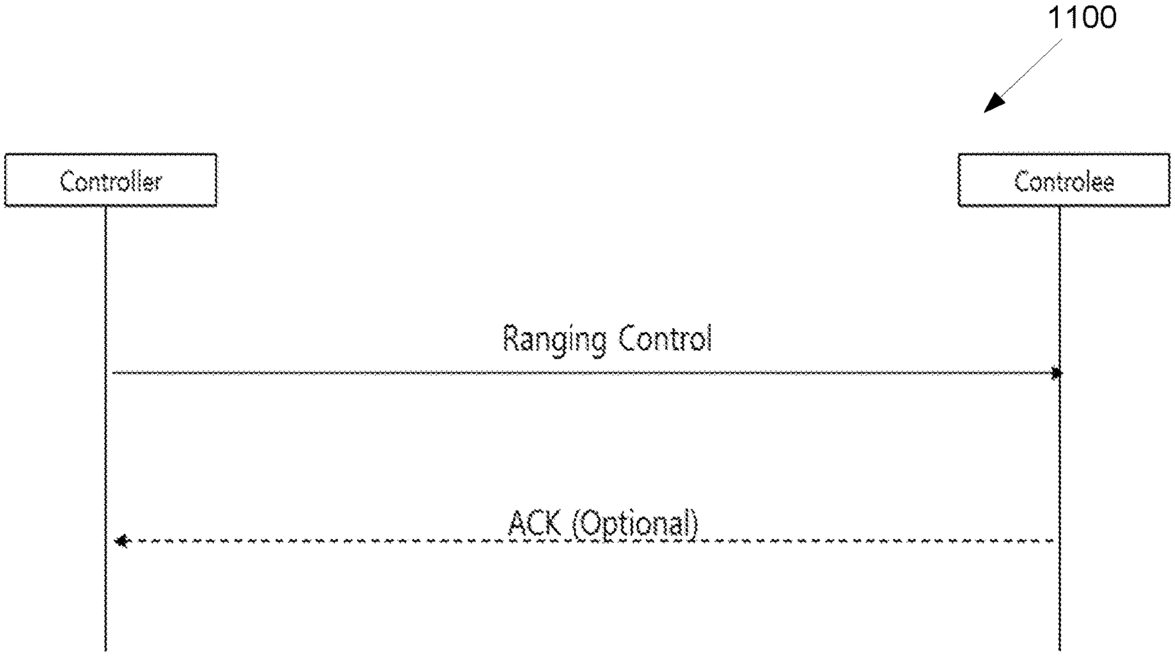
FIG. 11 illustrates a signaling flow including controller and controlee according to embodiments of the present disclosure.

FIG. 11 illustrates a signaling flow including controller and controlee 1100 according to embodiments of the present disclosure. The embodiment of the flow including controller and controlee 1100 illustrated in FIG. 11 is for illustration only. FIG. 11 does not limit the scope of the present disclosure to any particular implementation. The flow including controller and controlee 1100 may be used in the electronic device 501 as illustrated in FIG. 5. The flow including controller and controlee 1100 may be used in the electronic device 501 (e.g., 101-103 and 111-116 as illustrated in FIG. 1) as illustrated in FIG. 5.

The setting of a ranging configuration determined by the next higher layer can be sent to one or more ranging controlees from a ranging controller (lead device) as illustrated in FIG. 11. With different network formations, the ranging configuration can be conveyed via a dedicated data frame sent to one or more devices, or the ranging configuration can be embedded into a sync frame broadcast to all devices in the network. Meanwhile, this disclosure does not preclude other methods to exchange the ranging configuration information, e.g., via the higher layer or our-of-band management.

Figure 12:
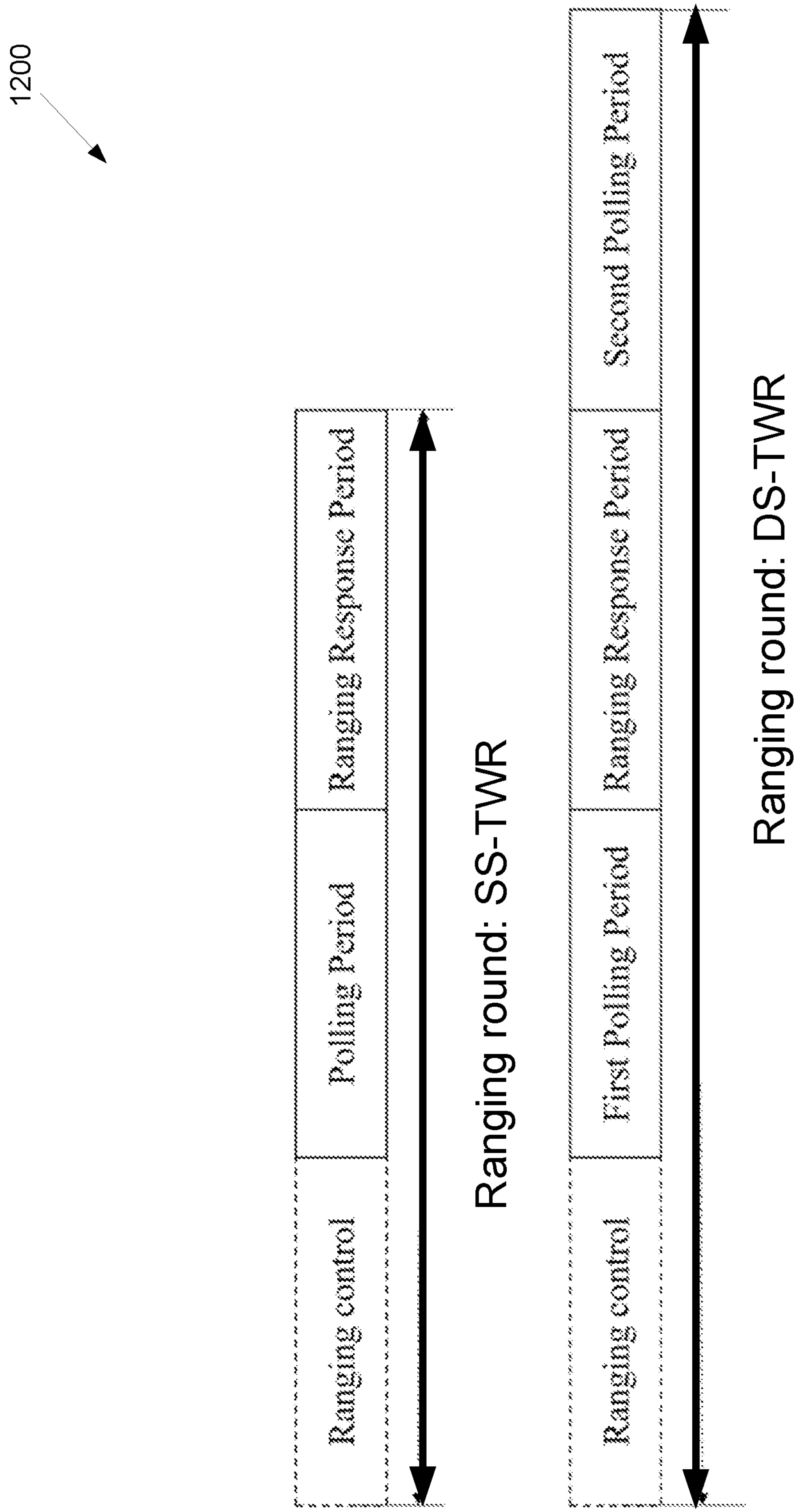
FIG. 12 illustrates an example ranging round structure according to embodiments of the present disclosure.

FIG. 12 illustrates an example ranging round structure 1200 according to embodiments of the present disclosure. The embodiment of the ranging round structure 1200 illustrated in FIG. 12 is for illustration only. FIG. 12 does not limit the scope of the present disclosure to any particular implementation. The ranging round structure 1200 may be used in the electronic device 501 (e.g., 101-103 and 111-116 as illustrated in FIG. 1) as illustrated in FIG. 5.

Ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s). FIG. 12 respectively illustrates two examples for the SS-TWR and DS-TWR with three message exchanges, other examples are not precluded. A ranging round can start with a ranging control period to exchange the ranging configuration over the UWB MAC. However, a ranging round can also start with a polling period if the ranging configuration is exchanged at the higher layer.

As illustrated in FIG. 12, for the SS-TWR, one ranging round contains a PP and an RRP. For the DS-TWR with three messages, one ranging round contains a first PP, an RRP, and a second PP. Each period includes one or more time slots, where transmissions from initiator(s)/responder(s) can be scheduled as determined by the next higher layer or the initiator(s)/responder(s) can contend time slots in the corresponding periods, respectively.

In one embodiment, control signaling structure and mechanism to configure UWB channel are provided. In such embodiment, the ranging channel selection (RCS) IE is introduced to signal the choice of UWB channel for next ranging round(s). Different mechanisms with various content field structures of RCS IE are described in the present disclosure.

In one example, IE format and mechanism are provided to adjust UWB channel.

FIG. 13 illustrates an example control filed format of RCS IE 1300 according to embodiments of the present disclosure. The embodiment of the control filed format of RCS IE 1300 illustrated in FIG. 13 is for illustration only. FIG. 13 does not limit the scope of the present disclosure to any particular implementation. The control filed format of RCS IE 1300 may be used in the electronic device 501 (e.g., 101-103 and 111-116 as illustrated in FIG. 1) as illustrated in FIG. 5.

The general IE format of RCS IE can be referred to LTE and NR standard specification, while an example of the content field format is illustrated in FIG. 13. One octet can be used in the content field, where first 4-bit field is used to indicate the UWB channel number that may be used for future ranging round(s) and remaining 4-bit field is reserved. The range of the Channel Number field lies in "0001"~"1110," which correspond to UWB channel #1~#14. Value "0000" and "1111" of Channel Number field are reserved. Other bit combinations to indicate different UWB channels are not precluded in this disclosure.

Fewer bits may be used to indicate the channel number due to regional-based regulations and device capability. For example, if a device is capable of supporting channel #5 and channel #9, 1-bit Channel Number field can be used: "0" denotes channel #5, and "1" indicates channel #9.

A controller transmits the RCS IE via an appropriate message, which is broadcast to all controlees. This message can be a ranging control message (RCM) in the beginning of a ranging round as in FIG. 11, or the message can be a data frame at the end of a ranging round. After exchange of RCS IE, controller and controlee(s) initiate countdown timers for PHY layer to configure the updated UWB sub-band, which can be called a channel configuration countdown timer (CCCT). CCCT is used to specify the time duration or the interval to change the channel. Other semantics, which has the same definition as CCCT, are not precluded, e.g., channel configuration time interval (CCTI or CCI). This CCCT can be exchanged via higher layer/out-of-band management (OOB) between devices. The minimum of CCCT has to be long enough for the devices to switch UWB channel after the current ranging round.

After one or more ranging rounds based on the new configured UWB channel via an RCS IE, the UWB channel may be reset to a default setting. Another countdown timer at controller and controlee(s) can be used here for the channel resetting, namely channel resetting countdown timer (CRCT). The setting of this countdown timer can also be exchanged via higher layer or OOB.

In one example, to support the exchange of CCCT or/and CRCT over IEEE 802.15.4z MAC, various content field structures of RCS IE are extended from the example illustrated in FIG. 13.

In one example, an IE format with time counter and mechanism to adjust UWB channel are provided.

FIG. 14 illustrates an example content field format of RCS IE with CCCT field 1400 according to embodiments of the present disclosure. The embodiment of the r content field format of RCS IE with CCCT field 1400 illustrated in FIG. 14 is for illustration only. FIG. 14 does not limit the scope of the present disclosure to any particular implementation. The content field format of RCS IE with CCCT field 1400 may be used in the electronic device 501 (e.g., 101-103 and 111-116 as illustrated in FIG. 1) as illustrated in FIG. 5.

The first bit-field, namely configuration countdown timer present (CCTP), is used to indicate the presence of CCCT field, i.e., if value of CCTP field is "1," 4-octet CCCT field is present; otherwise, CCCT field is not present. The field of channel number remains the same as that of FIG. 13. If fewer bits are used for the channel number, more bits of the first octet can be reserved.

The value of CCCT field has the unit of ranging scheduling time unit (RSTU) from IEEE 802.15.4z. FIG. 14 illustrates an example with 4-octet CCCT field, while other sizes are not precluded by this disclosure.

Similar to the aforementioned examples and embodiments, RCS IE can be transmitted via RCM or data frame from controller. CCCT can be exchanged between devices via the CCCT field of RCS IE, while CRCT, if supported, needs to be exchanged via the higher layer or OOB.

In one example, an IE format and mechanism are provided to configure UWB channel for a period of time.

FIG. 15 illustrates an example content field format of RCS IE with CCCT and CRCT field 1500 according to embodiments of the present disclosure. The embodiment of the content field format of RCS IE with CCCT and CRCT field 1500 illustrated in FIG. 15 is for illustration only. FIG. 15 does not limit the scope of the present disclosure to any particular implementation. The content field format of RCS IE with CCCT and CRCT field 1500 may be used in the electronic device 501 (e.g., 101-103 and 111-116 as illustrated in FIG. 1) as illustrated in FIG. 5.

As illustrated in FIG. 14 and FIG. 15, the field of channel resetting countdown timer (CRCT) is included, which specifies the duration of new configured UWB channel. Similar to CCTP, the field of resetting countdown timer present (RCTP) indicates whether CRCT field is present or not, i.e., if RCTP value is "1," CRCT field is present; otherwise the CRCT does not exist.

The value of CRCT field has the unit of ranging scheduling time unit (RSTU) from IEEE 802.15.4z. FIG. 15 illustrates an example with 4-octet CRCT field, while other sizes are not precluded by the present disclosure.

The general content field structure of RCS IE in FIG. 15 provides the flexibility to exchange CCCT/CRCT via UWB MAC or higher layer/OOB. If CCCT and CRCT have to be exchanged via higher layer/OOB, the RCS IE structure in FIG. 13 can be used to save bit-fields.

For certain use cases, if CCCT can be exchanged over UWB MAC, while CRCT has to be exchanged via higher layer/OOB, the RCS IE structure in FIG. 14 can be used. On the contrary. If CCCT has to be exchanged via higher layer/OOB, and CRCT can be exchanged over UWB MAC, the RCS IE structure in FIG. 16 can be used.

FIG. 16 illustrates an example content field format of RCS IE with CRCT field 1600 according to embodiments of the present disclosure. The embodiment of the content field format of RCS IE with CRCT field 1600 illustrated in FIG. 16 is for illustration only. FIG. 16 does not limit the scope of the present disclosure to any particular implementation. The content field format of RCS IE with CRCT field 1600 may be used in the electronic device 501 (e.g., 101-103 and 111-116 as illustrated in FIG. 1) as illustrated in FIG. 5.

In one embodiment, an IE format and a mechanism to adjust both preamble code and UWB channel are provided.

In the current spec of IEEE 802.15.4z, ranging preamble code selection (RPCS) IE is used to specify the transmit and receive preamble code of future RFRAME(s) for the feature of dynamic preamble selection (DPS). RPCS IE and newly defined RCS IE can be merged together to support features of DPS, and dynamic channel selection (DCS). The merged IE can be defined as ranging channel and preamble code selection (RCPCS) IE. An example of the content field is exhibited in FIG. 17.

FIG. 17 illustrates an example content field format of RCPCS IE with CRCT field 1700 according to embodiments of the present disclosure. The embodiment of the content field format of RCPCS IE with CRCT field 1700 illustrated in FIG. 17 is for illustration only. FIG. 17 does not limit the scope of the present disclosure to any particular implementation. The content field format of RCPCS IE with CRCT field 1700 may be used in the electronic device 501 (e.g., 101-103 and 111-116 as illustrated in FIG. 1) as illustrated in FIG. 5.

The last three fields of RCPCS IE in FIG. 17 fulfill the exchange for DPS, which are the same as the fields of RPCS IE in the IEEE 802.15.4z.

The content field structure of FIG. 17 includes fields of FIG. 15. However, depending on implementations, merges of RPCS IE with other examples of RCS IE, e.g., in FIGS. 13, 14, and 16 are not precluded to form RCPCS IE in this disclosure. For example, FIG. 18 illustrates another example of RCPCS IE content field format.

FIG. 18 illustrates an example ranging channel and preamble code selection IE content field format 1800 according to embodiments of the present disclosure. The embodiment of the ranging channel and preamble code selection IE content field format 1800 illustrated in FIG. 18 is for illustration only. FIG. 18 does not limit the scope of the present disclosure to any particular implementation. The ranging channel and preamble code selection IE content field format 1800 may be used in the electronic device 501 (e.g., 101-103 and 111-116 as illustrated in FIG. 1) as illustrated in FIG. 5.

The field of CCCT present (CCTP) indicates the presence of CCCT field. If the field of CCTP' value is 1, CCCT field is present. Otherwise, the CCCT field does not exist, and the setting of CCCT is specified by the next higher layer.

The field of preamble selection presence (PSP) indicates the presence of last three fields for DPS. If the field of PSP's value is 1, the last three fields are present. Otherwise, the last three fields do not exist, and PHY may use the preamble code specified in phyCurrentCode from the PIB.

The channel number field specifies the UWB channel number, i.e., #1~#14, corresponding to field values 0001~1110. The selection of channel number by upper layer depends on the device capability and regional-based regulation.

The 4-octet CCCT field specifies the timer duration between the exchange of this IE and configuration of selected channel, which is in the unit of ranging scheduling time unit (RSTU) from IEEE 802.15.4z.

In one embodiment, MAC service primitives for specifying dynamic channel selection (DCS) are provide.

After the time specified in CCCT of RCS or RCPCS IE, the next higher layer of devices can use MLME-DCS.request to request PHY utilize the given UWB channel until the expiration of the DcsDuration, which is specified by the CRCT. If the feature of UWB channel resetting is not supported, the given UWB channel may be used until the next MLME-DCS.request.

With the feature of UWB channel resetting, the semantics of this primitive are as follows:

```
MLME-DCS.request (
    ChannelNumber
    DcsDuration
    )
```

The primitive parameters are defined in TABLE 1.

TABLE 1

| MLME-DCS.request parameter | | | |
|---|---|---|---|
| Name | Type | Valid range | Description |
| ChannelNumber | Integer | 1~14 | UWB channel number |
| DcsDuration | Integer | 0~($2^{32}$ − 1) | The time, in the unit of RSTU, from the current time that PHY maybe operated on the UWB channel specified by ChannelNumber. |

The DcsDuration specified by CRCT may be long enough to fulfill at least one ranging round/cycle.

Without the feature of UWB channel resetting, the semantics of this primitive are as follows:

```
MLME-DCS.request (
    ChannelNumber
    )
```

The MLME-DCS.confirm primitive reports the results of the attempt to enable the DCS. The semantics of this primitive are as follows:

```
MLME-DCS.confirm (
    Status
    )
```

The primitive parameter is defined in TABLE 2.

TABLE 2

| MLME-DCS.confirm parameter | | | |
|---|---|---|---|
| Name | Type | Valid range | Description |
| Status | Enumeration | SUCCESS, DCS_NOT_SUPPORTED | The result of the request to enable the selected channel. |

The MLME-DCS.confirm primitive is generated by the MLME and issued to a next higher layer in response to an MLME-DCS.request primitive. If ChannelNumber in the MLME-DCS.request is not supported, the status of DCS_NOT_SUPPORTED is returned. If the request to enable the selected ranging channel was successful, the MLME issue the MLME-DCS.confirm primitive with a status of SUCCESS.

With the feature of UWB channel resetting, the MLME-DCS.indication primitive indicates the expiration of DcsDuration, and the resetting of the default UWB channel. The semantics of this primitive are as follows:

MLME-DCS.indication ( )

When DcsDuration, specified by CRCT, is expired, MLME issues the MLME-DCS.indication primitive to the next higher layer.

In one embodiment, message exchange flow to configure UWB channel is provided.

Figure 19:
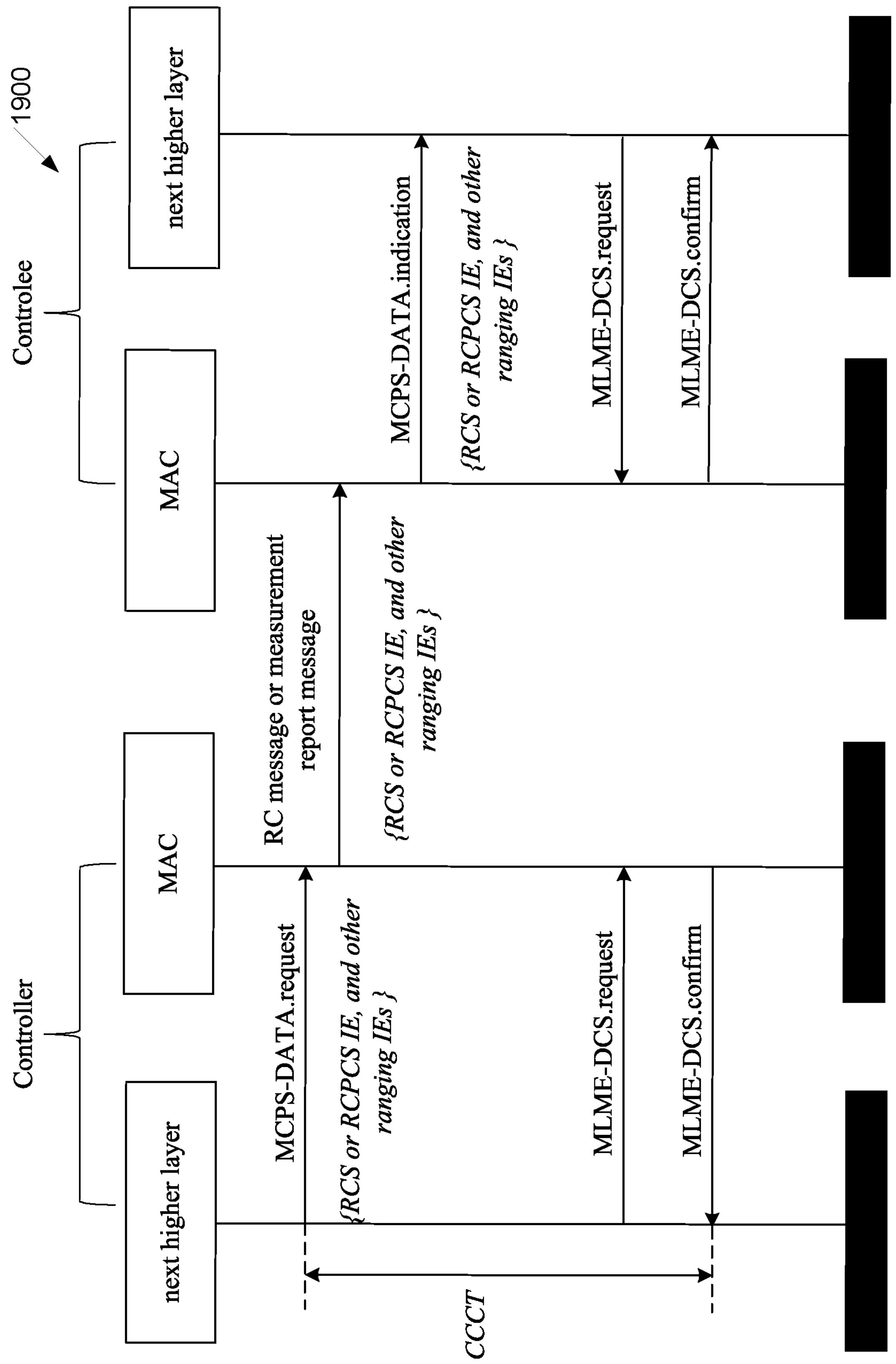
FIG. 19 illustrates a signaling flow for DCS without channel resetting according to embodiments of the present disclosure.

FIG. 19 illustrates a signaling flow for DCS without channel resetting 1900 according to embodiments of the present disclosure. The embodiment of the signaling flow for DCS without channel resetting 1900 illustrated in FIG. 19 is for illustration only. FIG. 19 does not limit the scope of the present disclosure to any particular implementation. The signaling flow for DCS without channel resetting 1900 may be performed med by the electronic device 501 (e.g., 101-103 and 111-116 as illustrated in FIG. 1) as illustrated in FIG. 5.

FIG. 19 illustrates an example of message sequence chart for DCS without channel resetting. RCS or RCPCS IE is inserted in the ranging control message (RCM) or appropriate data frame from controller to controlee(s), which includes Channel Configuration Countdown Timer (CCCT). Shortest CCCT is long enough for the PHY to configure for a new UWB channel. A next higher layer utilizes MLME-DCS.request to inform PHY the given ChannelNumber. If MLME-DCS.confirm returns SUCCESS, given UWB channel is configured for future ranging round(s). Otherwise, given UWB channel is not enabled.

Specifically, the originator may transmit the RCPCS IE (or RCS IE) to exchange the sub-band selection for the coordination of ranging channel. The coordination of ranging channel is needed only when using the optional DCS capability of the PHY. For the multi-node advanced ranging scheme in IEEE 802.15.4z, a controller is the originator to initiate DCS, and RCPCS IE can be inserted in the ranging control message (RCM).

In the coordination process of ranging channel, a timer may be initiated at the next higher layer of both sides of the link. CCCT specifies this timer duration, after which the selected channel is configured. The setting of CCCT is determined by the originator next higher layer, which may be exchanged via RCPCS IE. CCCT has to be long enough for PHY to configure a channel switch. The bottom interactions between next higher layer and MAC illustrate the use of the MLME-DCS.request, and the MLME-DCS.confirm. Use of these primitives is unique to the optional DCS.

Upon the assertion of the MLME-DCS.confirm primitives, as illustrated in FIG. 19, PHYs of both sides have switched to a selected channel, where future ranging round (s) may be operated on. After a certain period of time, if the originator intends to switch to another available channel or back to a previous one, the originator can reiterate procedures illustrated in FIG. 19, where a MLME-DCS.request primitive with desired ChannelNumber may be initiated. DCS provides more flexibility to manage multi-node ranging and can also help to avoid collisions.

After the configuration of DCS, future ranging round(s) may be operated on the selected UWB channel. To reconfigure the UWB channel, procedures exhibited in FIG. 19 can be reiterated.

Figure 20:
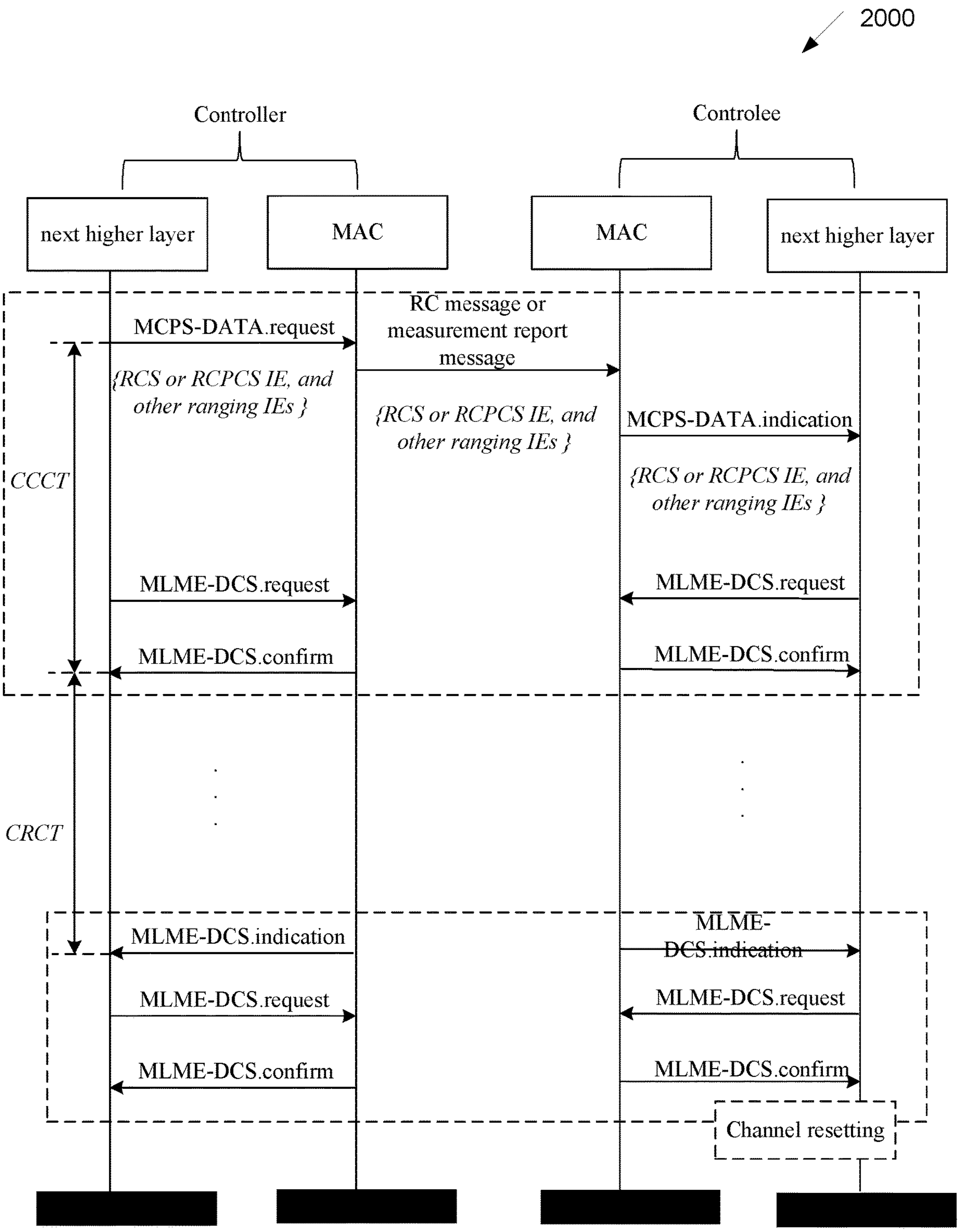
FIG. 20 illustrates a signaling flow for DCS with channel resetting according to embodiments of the present disclosure.

FIG. 20 illustrates a signaling flow for DCS with channel resetting 2000 according to embodiments of the present disclosure. The embodiment of the signaling flow for DCS with channel resetting 2000 illustrated in FIG. 20 is for illustration only. FIG. 20 does not limit the scope of the present disclosure to any particular implementation. The signaling flow for DCS with channel resetting 2000 may be performed by the electronic device 501 (e.g., 101-103 and 111-116 as illustrated in FIG. 1) as illustrated in FIG. 5.

FIG. 20 illustrates an example of message sequence chart for DCS with channel resetting. The top dotted box remains the same as FIG. 19. Channel Resetting Countdown Timer (CRCT) is exchanged via RCS or RCPCS IE, see FIGS. 15 to 17. Ranging rounds within the period specified by CRCT are operated on the selected UWB channel.

After the completion of CRCT, a MAC sublayer initiates MLME-DCS.indication to the next higher layer to indicate the expiration of DcsDuration. Then, next higher layer uses MLME-DCS.request to reset the UWB channel to the default setting.

In one example, DCS without channel resetting configured by MLME-SET.request primitive is provided.

For the dynamic channel selection without channel resetting as described in the aforementioned examples and embodiments, the next higher layer can also configure the PHY for the selected channel via the MLME-SET.request. An example of message sequence chart of DCS configured by MLME-SET.request is illustrated in the FIG. 21.

Figure 21:
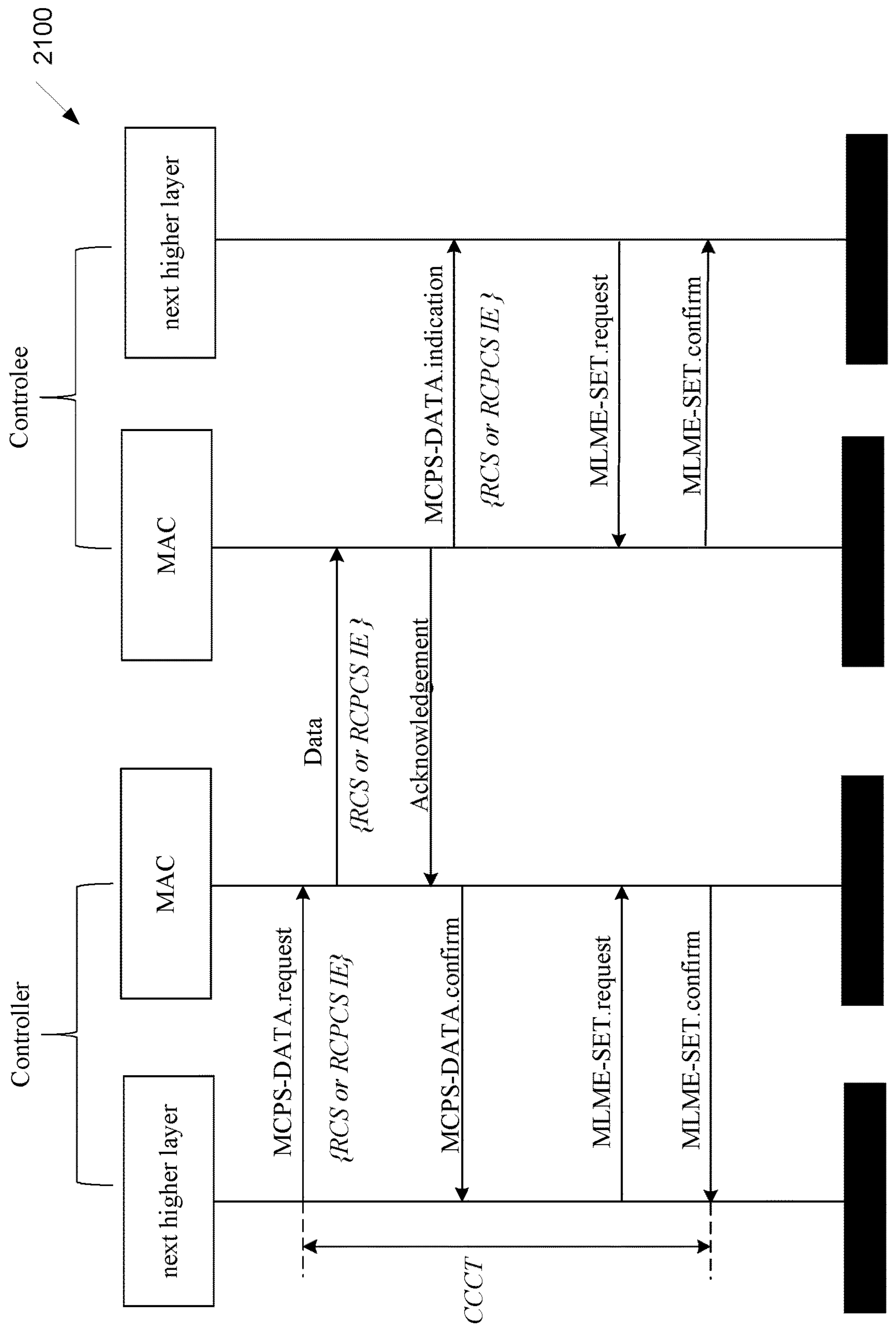
FIG. 21 illustrates another signaling flow for DCS without channel resetting according to embodiments of the present disclosure.

FIG. 21 illustrates another signaling flow for DCS without channel resetting 2100 according to embodiments of the present disclosure. The embodiment of the signaling flow for DCS without channel resetting 2100 illustrated in FIG. 21 is for illustration only. FIG. 21 does not limit the scope of the present disclosure to any particular implementation. The signaling flow for DCS without channel resetting 2100 may be performed by the electronic device 501 (e.g., 101-103 and 111-116 as illustrated in FIG. 1) as illustrated in FIG. 5.

Similar to FIG. 18, the exchange of the selected channel is initialized by the next higher layer of the controller. The RCPCS IE (or RCS IE) can be inserted in an appropriate data message or RFRAME from the controller to the controlee. For example, the RCPCS IE (or RCS IE) can be a ranging control message (RCM) as illustrated in the FIG. 11, or the RCPCS IE (or RCS IE) can be a ranging initiation message (RFRAME) from the Controller/Initiator, or the RCPCS IE (or RCS IE) can be a data message to report ranging-related measurements in the measurement report phase of a ranging round.

Upon reception of the data message conveying the RCPCS IE, the controlee may send back the acknowledgement if the AR field of the received data message is set to one. Otherwise, the controlee may not send the acknowledgement. The next higher layer of the controlee acquires the RCPCS IE (or RCS IE) via the MCPS-DATA.indication. After the specified CCCT (or CCI), both controller and controlee(s) can configure the PHY with the selected channel via the MLME-SET.request, where the phyCurrentPage and phyCurrentChannel may be set according to the exchanged RCPCS IE (or RCS IE). Then, MLME-SET.confirm may return the status in response to the MLME-SET.request.

In the development of IEEE 802.15.4z, the feature of selecting UWB channel and preamble codes for transmission/reception can be viewed as the selection of a composite/complex channel, which is not precluded by this disclosure. The timer to count the time interval between the DCS request and DCS configuration, i.e., CCCT in FIGS. 20 and 21, can be operated in either MAC layer or next higher layer. Similarly, the timer to count the effective duration of the configured complex channel, i.e., CRCT in FIG. 20, can also be operated in either MAC layer or next higher layer.

In this scheme, a timestamp parameter is introduced to the request primitive of DCS. The timestamp parameter is used to let the next higher layer inform the MAC sublayer when to configure the new complex channel. Therefore, the next higher layer may not need to keep a time counter. Incorporating the feature of preamble code selection, the request primitive of DCS becomes:

```
MLME-DPS.request (
  TxDpsIndex,
  RxDpsIndex,
  ChannelNumber,
  DpsDuration,
  TimeConfig
  )
```

The parameters of TxDpsIndex, RxDpsIndex remain the same as those definitions in the IEEE 802.15.4-2015. TimeConfig parameter indicates the future time to apply new channel configuration, which is the same as the CCCT in FIG. 20, while DpsDuration is the same as DcsDuration in the aforementioned embodiment, i.e., the CRCT in FIG. 20 for the effective duration of the new channel. An example of the definition for the TimeConfig can be found in TABLE 3. Other types, ranges, and semantics of the parameter to fulfill the same function are not precluded by the present disclosure.

TABLE 3

MLME-DPS.request parameters

| Name | Type | Valid range | Description |
|---|---|---|---|
| TimeConfig | Integer | 0x000000-0xffffff | This parameter specifies the time in the units of ranging scheduling time unit (RSTU) for the PHY to configure the selected DPS indices, and channel number. |

Figure 22:
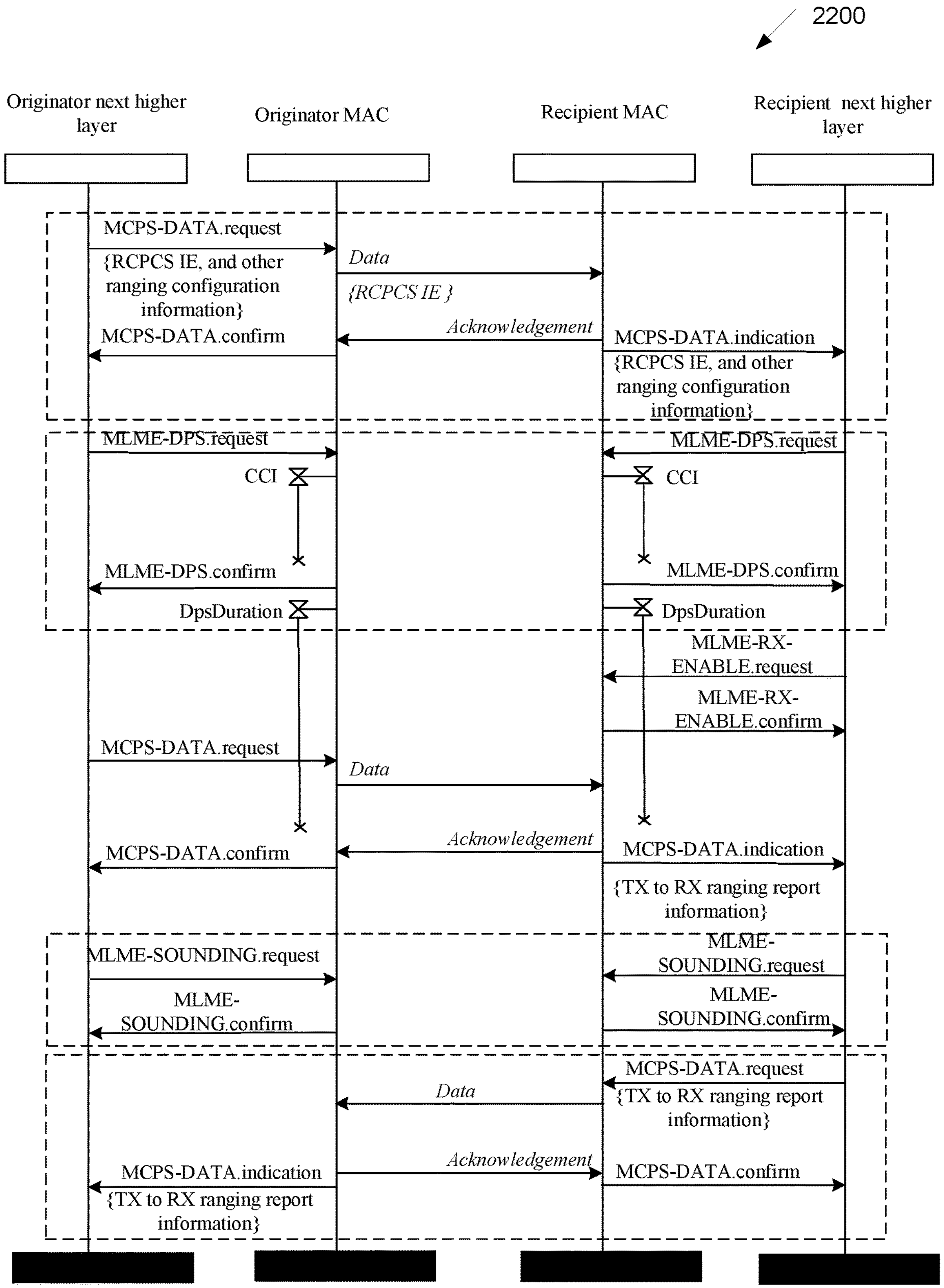
FIG. 22 illustrates a signaling flow for DCS/DPS with timer at the MAC sublayer according to embodiments of the present disclosure.

An example of message sequence chart of ranging, along with the DCS (or we say DPS), can be found in FIG. 22.

FIG. 22 illustrates a signaling flow for DCS/DPS with timer at the MAC sublayer 2200 according to embodiments of the present disclosure. The embodiment of the signaling flow for DCS/DPS with timer at the MAC sublayer 2200 illustrated in FIG. 22 is for illustration only. FIG. 22 does not limit the scope of the present disclosure to any particular implementation. The signaling flow for DCS/DPS with timer at the MAC sublayer 2200 may be performed by the electronic device 501 (e.g., 101-103 and 111-116 as illustrated in FIG. 1) as illustrated in FIG. 5.

The top dotted box in FIG. 22 illustrate the use of a data exchange to affect the coordination of the preambles and UWB channel to be used for a ranging exchange. As illustrated in FIG. 22, the information of the selected preamble code and channel number can be exchanged via the ranging channel and preamble code selection IE (RCPCS IE) as described in the aforementioned embodiment. The second from the top dotted box in FIG. 22 illustrates the use of the MLME-DPS.request, and the MLME-DPS.confirm.

The next higher layer of the device can optionally specify a future time when to apply the selected preamble code and/or channel number by the MLME-DPS.request, while the MAC sublayer may report a status via MLME-DPS.confirm. The time interval between the assertion of the MLME-DPS.request and the new channel configuration, namely channel configuration interval (CCI), can be exchanged via the RCPCS IE.

CCI has to be long enough for PHY to configure a channel switch. Note that it is the responsibility of the ERDEV's next higher layer to apply the new channel configuration at the appropriate time for transmission and reception. It is also the responsibility of the next higher layer to ensure that the channel selection reflect the regional regulation. If the selected channel is not supported by the device, the DPS may fail, and the MLME-DPS.confirm primitive may report Status parameter value of DPS_NOT_SUPPORTED.

Upon the assertion of the MLME-DPS.confirm primitives, as illustrated in FIG. 22, both devices have switched to use the alternative preamble symbols and/or channel number selected by the MLME-DPS.request. Any negotiated ranging method can be applied over the new configured complex channel. Once the effective duration of the new configured channel expires, the next higher layer of ranging devices can reset the complex the channel.

Figure 23:
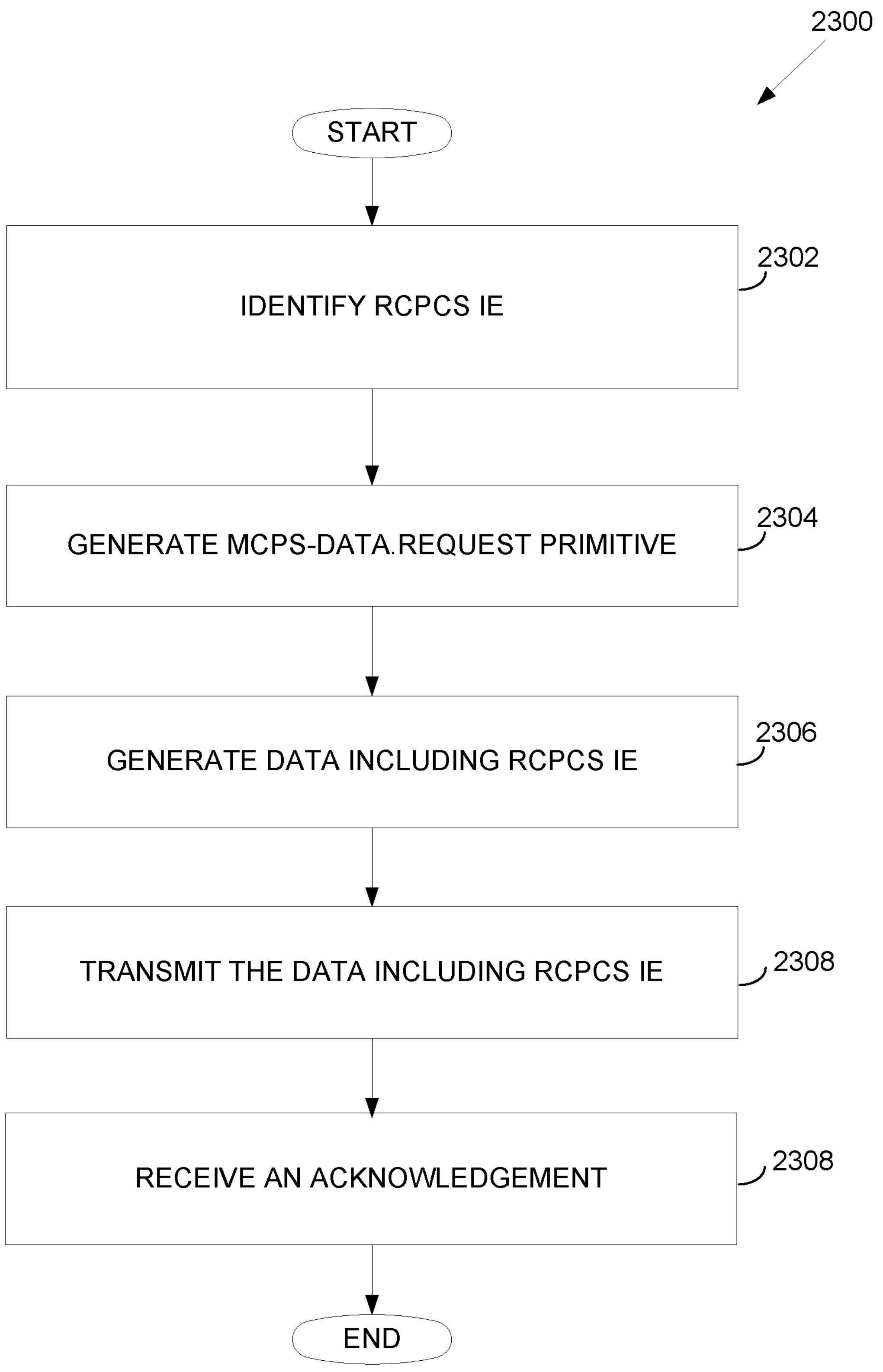
FIG. 23 illustrates a flowchart of a method for dynamic channel selection according to embodiments of the present disclosure.

FIG. 23 illustrates a flowchart of a method 2300 for dynamic channel selection according to embodiments of the present disclosure, as may be performed by a network entity. The embodiment of the method 2300 illustrated in FIG. 23 is for illustration only. FIG. 23 does not limit the scope of the present disclosure to any particular implementation. The method 2300 may be performed in the electronic device 501 (e.g., 101-103 and 111-116 as illustrated in FIG. 1) as illustrated in FIG. 5. The electronic device may be implemented as a network entity.

As shown in FIG. 23, the method 2300 begins at step 2302. In step 2303, the network entity identifies, at a higher layer, a ranging channel and preamble code selection information element (RCPCS IE) to indicate a sub-band to be selected for the ranging channel operation, wherein the RCPCS IE includes a channel configuration interval (CCI) of a CCI timer.

Subsequently, the network entity in step 2304 generates, at the higher layer, a medium access control common part sublayer data request (MCPS-DATA.request) primitive including the RCPCS IE, wherein the MCPS-DATA.request primitive is transmitted to a MAC layer.

Subsequently, the network entity in step 2306, in response to receiving, at the MAC layer, the MCPS-DATA.request primitive from the higher layer, generates data including the RCPCS IE.

Next, the network entity in step 2308 the network entity transmits, to another network entity, the data including the RCPCS IE, wherein the RCPCS IE includes a channel resetting counter (CRCT) that is configured as a duration for maintaining the sub-band.

In one embodiment, in step 2308, the CRCT is configured as a duration for maintaining a preamble code that is used by the first network entity and the second network entity; and the CRCT configured as the duration for maintaining the sub-band is used by the first network entity and the second network entity.

Finally, in step 2310, the network entity receives an acknowledgement corresponding to the data including the RCPCS IE.

In one embodiment, the network entity activates the CCI timer with the CCI in response to generating the MCPS-DATA.request primitive.

In one embodiment, the network entity generates a ranging control message (RCM) including the RCPCS IE and transmits the RCM including the RCPCS IE.

In one embodiment, the network entity transmits, to the MAC layer, a MAC layer management entity set request (MLME-SET.request) primitive to adjust a physical layer current channel (phyCurrentChannel) and a physical layer current page (phyCurrentPage) and selects the sub-band that is indicated by the RCPCS IE based on the phyCurrentChannel and the phyCurrentPage in response to expiring the CCI timer.

In one embodiment, the network entity generates the RCPCS IE including: a CCI present (CCIP) field indicating whether a CCI field is included in the RCPCS IE; a preamble sequence selection present (PSP) field indicating whether at least one preamble sequence selection field is included in the RCPCS IE; and a channel number field indicating a channel number used for the first network entity and a second network entity.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope

What is claimed is:

1. A first network entity in a wireless communication system supporting a ranging channel operation, the first network entity comprising:

a processor configured to:

identify, at a higher layer, a ranging channel and preamble code selection information element (RCPCS IE) to indicate a sub-band to be selected for the ranging channel operation, wherein the RCPCS IE includes a channel configuration interval (CCI) of a CCI timer;

generate, at the higher layer, a medium access control common part sublayer data request (MCPS-DATA.request) primitive including the RCPCS IE, wherein the MCPS-DATA.request primitive is transmitted to a MAC layer;

in response to receiving, at the MAC layer, the MCPS-DATA.request primitive from the higher layer, generate data including the RCPCS IE; and a transceiver operably connected to the processor, the transceiver configured to:

transmit, to a second network entity, the data including the RCPCS IE, wherein the RCPCS IE includes a channel resetting counter (CRCT) that is configured as a duration for maintaining the sub-band; and receive an acknowledgement corresponding to the data including the RCPCS IE.

2. The first network entity of claim 1, wherein the processor is further configured to activate the CCI timer with the CCI in response to generating the MCPS-DATA.request primitive.

3. The first network entity of claim 1, wherein:

the processor is further configured to generate a ranging control message (RCM) including the RCPCS IE; and the transceiver is further configured to transmit the RCM including the RCPCS IE.

4. The first network entity of claim 1, wherein the processor is further configured to:

transmit, to the MAC layer, a MAC layer management entity set request (MLME-SET.request) primitive to adjust a physical layer current channel (phyCurrentChannel) and a physical layer current page (phyCurrentPage); and select the sub-band that is indicated by the RCPCS IE based on the phyCurrentChannel and the phyCurrentPage in response to expiring the CCI timer.

5. The first network entity of claim 1, wherein the processor is further configured to generate the RCPCS IE including:

a CCI present (CCIP) field indicating whether a CCI field is included in the RCPCS IE;

a preamble sequence selection present (PSP) field indicating whether at least one preamble sequence selection field is included in the RCPCS IE; and a channel number field indicating a channel number used for the first network entity and a second network entity.

6. The first network entity of claim 1, wherein the CRCT is configured as a duration for maintaining a preamble code that is used by the first network entity and the second network entity.

7. The first network entity of claim 1, wherein the CRCT configured as the duration for maintaining the sub-band is used by the first network entity and the second network entity.

8. A second network entity in a wireless communication system supporting a ranging channel operation, the second network entity comprising:

a transceiver, configured to receive, from a first network entity, data including a ranging channel and preamble code selection information element (RCPCS IE), wherein the RCPCS IE includes a channel resetting counter (CRCT) that is configured as a duration for maintaining a sub-band; and a processor operably connected to the transceiver, the processor configured to identify, at a higher layer, the RCPCS IE indicating the sub-band to be selected for the ranging channel operation, wherein the RCPCS IE includes a channel configuration interval (CCI) of a CCI timer, and wherein the transceiver is further configured to transmit, to the first network entity, an acknowledgement corresponding to the data including the RCPCS IE.

9. The second network entity of claim 8, wherein the processor is further configured to activate the CCI timer with the CCI corresponding to primitives related to a medium access control (MAC) layer.

10. The second network entity of claim 8, wherein:

the transceiver is further configured to receive a ranging control message (RCM) including the RCPCS IE; and the processor is further configured to identify the RCM including the RCPCS IE.

11. The second network entity of claim 8, wherein the processor is further configured to:

select the sub-band that is indicated by the RCPCS IE based on the phyCurrentChannel and the phyCurrentPage in response to expiring the CCI timer.

12. The second network entity of claim 8, wherein the processor is further configured to identify the RCPCS IE including:

a CCI present (CCIP) field indicating whether a CCI field is included in the RCPCS IE;

a preamble sequence selection present (PSP) field indicating whether at least one preamble sequence selection field is included in the RCPCS IE; and a channel number field indicating a channel number used for the first network entity and a second network entity.

13. The second network entity of claim 8, wherein the CRCT is configured as a duration for maintaining a preamble code that is used by the first network entity and the second network entity.

14. The second network entity of claim 8, wherein the CRCT configured as the duration for maintaining the sub-band is used by the first network entity and the second network entity.

15. A method of a first network entity in a wireless communication system supporting a ranging channel operation, the method comprising:

identifying, at a higher layer, a ranging channel and preamble code selection information element (RCPCS IE) to indicate a sub-band to be selected for the ranging channel operation, wherein the RCPCS IE includes a channel configuration interval (CCI) of a CCI timer;

generating, at the higher layer, a medium access control common part sublayer data request (MCPS-DATA.request) primitive including the RCPCS IE, wherein the MCPS-DATA.request primitive is transmitted to a MAC layer;

in response to receiving, at the MAC layer, the MCPS-DATA.request primitive from the higher layer, generating data including the RCPCS IE;

transmitting, to a second network entity, the data including the RCPCS IE, wherein the RCPCS IE includes a channel resetting counter (CRCT) that is configured as a duration for maintaining the sub-band; and receiving an acknowledgement corresponding to the data including the RCPCS IE.

16. The method of claim 15, further comprising activating the CCI timer with the CCI in response to generating the MCPS-DATA.request primitive.

17. The method of claim 15, further comprising:

generating a ranging control message (RCM) including the RCPCS IE; and transmitting the RCM including the RCPCS IE.

18. The method of claim 15, further comprising:

transmitting, to the MAC layer, a MAC layer management entity set request (MLME-SET.request) primitive to adjust a physical layer current channel (phyCurrentChannel) and a physical layer current page (phyCurrentPage); and selecting the sub-band that is indicated by the RCPCS IE based on the phyCurrentChannel and the phyCurrentPage in response to expiring the CCI timer.

19. The method of claim 15, further comprising generating the RCPCS IE including:

a CCI present (CCIP) field indicating whether a CCI field is included in the RCPCS IE;

a preamble sequence selection present (PSP) field indicating whether at least one preamble sequence selection field is included in the RCPCS IE; and a channel number field indicating a channel number used for the first network entity and a second network entity.

20. The method of claim 15, wherein:

the CRCT is configured as a duration for maintaining a preamble code that is used by the first network entity and the second network entity; and the CRCT configured as the duration for maintaining the sub-band is used by the first network entity and the second network entity.

* * * * *